(12) United States Patent
Arai

(10) Patent No.: US 7,424,605 B2
(45) Date of Patent: Sep. 9, 2008

(54) COMMUNICATION SYSTEM, SERVER DEVICE, CLIENT DEVICE AND METHOD FOR CONTROLLING THE SAME

(75) Inventor: Shunji Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 10/318,861

(22) Filed: Dec. 13, 2002

(65) Prior Publication Data

US 2003/0115460 A1 Jun. 19, 2003

(30) Foreign Application Priority Data

Dec. 19, 2001 (JP) ............................ 2001-385869

(51) Int. Cl.
*H04L 9/00* (2006.01)
(52) U.S. Cl. .................................................. 713/151
(58) Field of Classification Search ................ 713/168, 713/151; 726/12
See application file for complete search history.

(56) References Cited

U.S. PATENT DOCUMENTS

| 6,108,789 | A * | 8/2000 | Dancs et al. .................... 726/9 |
| 6,772,331 | B1 * | 8/2004 | Hind et al. .................. 713/151 |
| 7,024,553 | B1 | 4/2006 | Morimoto |
| 7,039,021 | B1 | 5/2006 | Kokudo |
| 7,069,587 | B2 * | 6/2006 | Ito ............................... 726/17 |
| 2002/0032855 | A1 * | 3/2002 | Neves et al. ................. 713/154 |
| 2002/0174335 | A1 * | 11/2002 | Zhang et al. ................. 713/168 |
| 2003/0084287 | A1 * | 5/2003 | Wang et al. .................. 713/168 |

FOREIGN PATENT DOCUMENTS

| EP | 1124397 A2 | 8/2001 |
| EP | 1124397 A3 | 2/2002 |
| EP | 1340337 | 9/2003 |
| JP | 10145369 A | 5/1998 |
| JP | 2002-125270 | 10/2000 |
| JP | 2001111543 A | 4/2001 |
| JP | 2001111544 A | 4/2001 |

(Continued)

OTHER PUBLICATIONS

Toshiaki Tanaka, et al., Nomadic Computing Environment Employing Wired and Wireless Networks, Jan. 12, 1998, IEICE Trans. Commun., vol. E81-B, No. 8.

(Continued)

*Primary Examiner*—Kambiz Zand
*Assistant Examiner*—Jason K Gee
(74) *Attorney, Agent, or Firm*—Morgan & Finnegan, LLP

(57) ABSTRACT

When a client server is permitted to be connected to a network through a first access point based on authentication by an authentication server, the authentication server informs the first access point of an encipher key such as a WEP key used for encipher communication between the client device and the first access point. Then, when the client device is moved to a communicable range of a second access point, the authentication server creates no new encipher keys but informs the second access point of the encipher key used for the encipher communication with the first access point, whereby encipher communication is executed between the client device and the second access point by using the same encipher key as that used for the encipher communication with the first access point.

4 Claims, 5 Drawing Sheets

FOREIGN PATENT DOCUMENTS

| | | |
|---|---|---|
| JP | 2001258059 A | 9/2001 |
| WO | 01/22685 A1 | 3/2001 |
| WO | 01/24560 A1 | 4/2001 |
| WO | 02/096151 A1 | 11/2002 |

OTHER PUBLICATIONS

European Search Report, EP 02 25 8074, Apr. 23, 2003.
EP Search Report mailed Nov. 23, 2006 in corresponding EP Appln. 02 258 0740.0-1244 (4 pgs.).

* cited by examiner

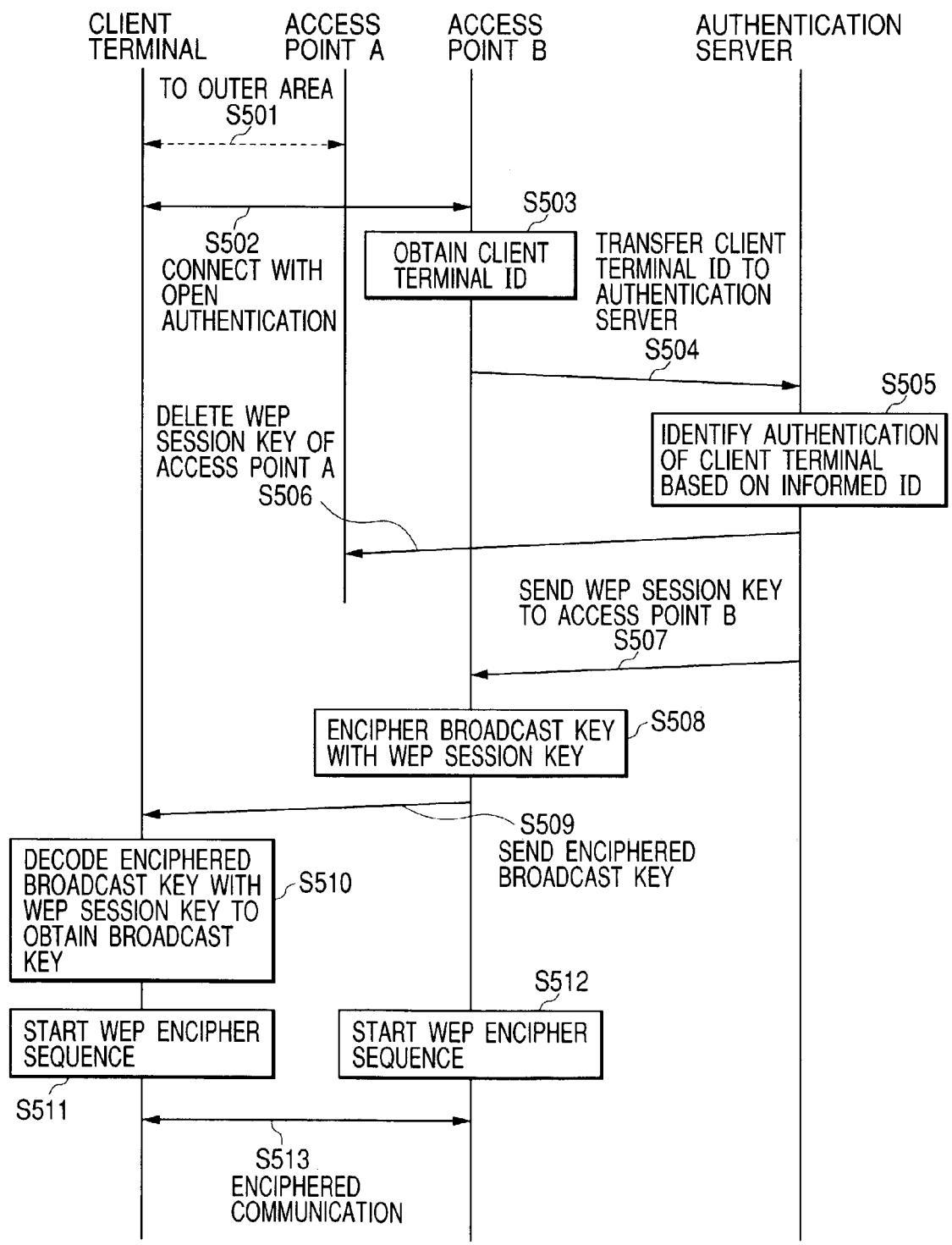

COMMUNICATION SYSTEM, SERVER DEVICE, CLIENT DEVICE AND METHOD FOR CONTROLLING THE SAME

BACKGROUND OF THE INVENTION

1. Field of the Invention

The present invention relates to a communication system, in which a server device informs an access point of an encipher key used when a client terminal performs communication through the access point.

2. Description of the Related Art

Conventionally, in a wireless LAN system, a client terminal has been connected to a network through wireless communication with an access point on the network.

There is also a wireless LAN system, in which a client terminal receives authentication of connection to a network through an access point from an authentication server on a network.

In such a system, when the client terminal receives authentication from the authentication server, the client terminal and the authentication server create an encipher key of a wired equivalent privacy (WEP) encipher system, and the authentication server informs the access point of the created encipher key. Then, the client terminal transfers enciphered data with the access point by using the encipher key of the WEP encipher system to perform secure wireless communication.

Incidentally, a communicable range of the access point is limited to a range reached by electric waves. On the other hand, the client terminal can be freely moved. Accordingly, the client terminal may be moved from a communicable range of an access point 1 to a communicable range of an access point 2. In this case, the client terminal must receive authentication of connection to the network from the authentication server again through wireless communication with the access point 2, the client terminal and the authentication server must create a new WEP key, and the authentication server must inform the access point 2 of the new WEP key.

That is, when the client terminal changed the access point, re-authentication from the authentication server, creation of a new WEP key, informing of a WEP key, and the like prolonged the process until communication became possible. Consequently the process took time.

In addition, in a system of many client terminals, since authentication and creation of a WEP key prolonged a process, a load on an authentication server inevitably became large.

Furthermore, since the process took time when the access point was changed, usability was reduced.

SUMMARY OF THE INVENTION

An object of the present invention is to improve usability of a system and a device.

Another object of the present invention is to shorten time until communication becomes possible when a client terminal changes an access point.

Yet another object of the present invention is to reduce a process when a client terminal changes an access point.

Other objects of the present invention will become apparent upon reading of detailed description and drawings.

BRIEF DESCRIPTION OF THE DRAWINGS

FIG. 5 is a sequential view of the system operation according to the embodiment of the invention.

DETAILED DESCRIPTION OF THE PREFERRED EMBODIMENTS

Next, description will be made of an embodiment of the present invention.

Figure 1:
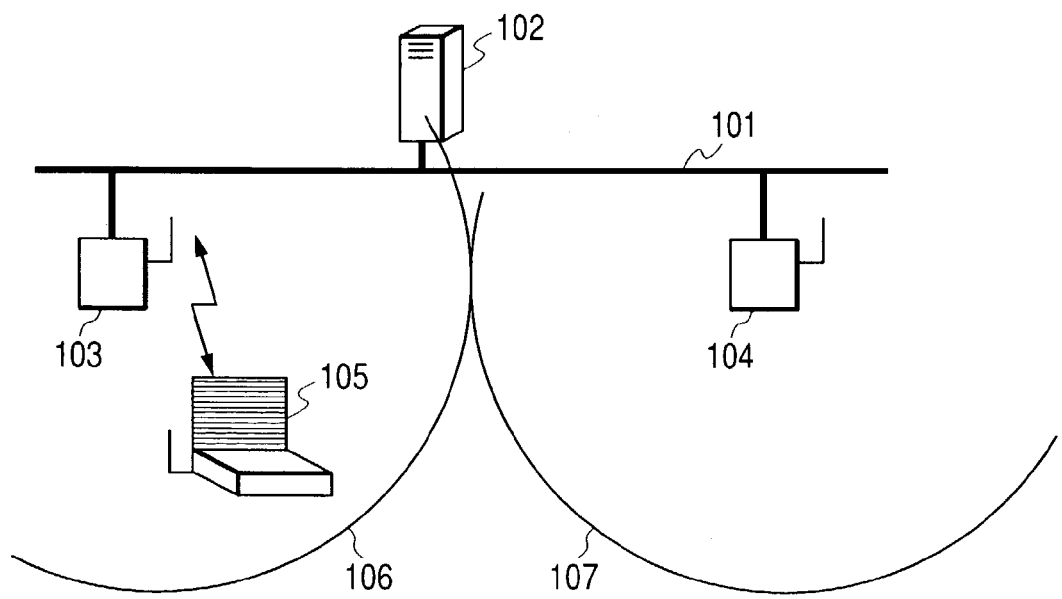
FIG. 1 is a configuration view of a system according to an embodiment of the present invention.

FIG. 1 is a configuration view of a system according to the embodiment of the invention.

A reference numeral 101 denotes a network, to which an access point A103, and an access point B104 are connected. The two access points are shown in FIG. 1, but the number of installed points is not limited to two. Each of the access points A103 and B104 can perform wireless communication with a client terminal 105 present in communicable ranges 106, 107. According to the embodiment, as a wireless communication system, a wireless local area network (LAN) based on a standard such as IEEE 802.11, IEEE 802.11b, or IEEE 802.11a is used.

The reference numeral 105 is the client terminal, which is connected to the network 101 through wireless communication with the access point A103 or B104. Though not shown in FIG. 1, a plurality of client terminals 105 may be present.

A reference numeral 102 denotes an authentication server, which authenticates the client terminal 105 connected to the network 101, and creates an encipher key used in a wired equivalency privacy (WEP) encipher system.

Figure 2:
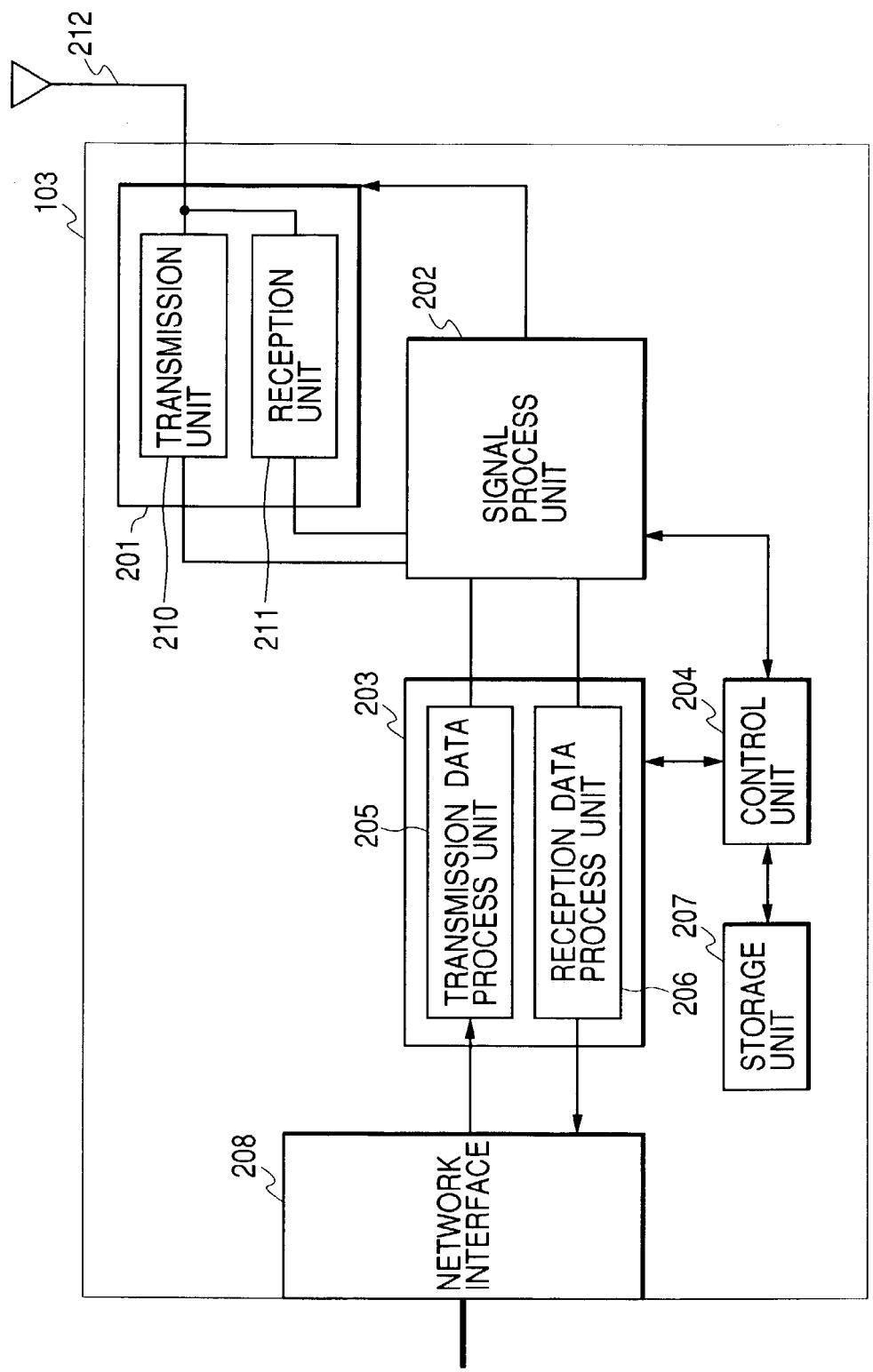
FIG. 2 is a block diagram of an access point according to the embodiment of the invention.

FIG. 2 is a block diagram of the access point A103.

A case of the access point B104 is similar.

A reference numeral 201 denotes a wireless unit, which transfers wireless data. The wireless unit 201 is constituted of a transmission unit 210, a reception unit 211, and an antenna 212.

A reference numeral 202 denotes a signal process unit, which detects a signal received by the reception unit 211 to convert it into a digital signal, and modulates the signal in order to transmit a digital signal sent from a data process unit 203 by wireless. In addition, the signal process unit 202 has a function of adding a header or the like in order to use data sent from the data process unit 203 for wireless transmission, and removing a header or the like from received data to send it to the data process unit 203.

The reference numeral 203 is the data process unit, which is constituted of a transmission data process unit 205 for enciphering data from a network interface 208 by a WEP encipher system, and a reception data process unit 206 for decoding enciphered data.

A reference numeral 204 denotes a control unit, which executes determination of presence of a new client terminal 105, control of the entire access point A103, and the like.

A reference numeral 207 denotes a storage unit, which stores an encipher key for WEP enciphering, and information regarding an ID or the like of the client terminal 105.

The reference numeral 208 is the network interface, which is an interface between the access point A103 and the network 101.

Figure 3:
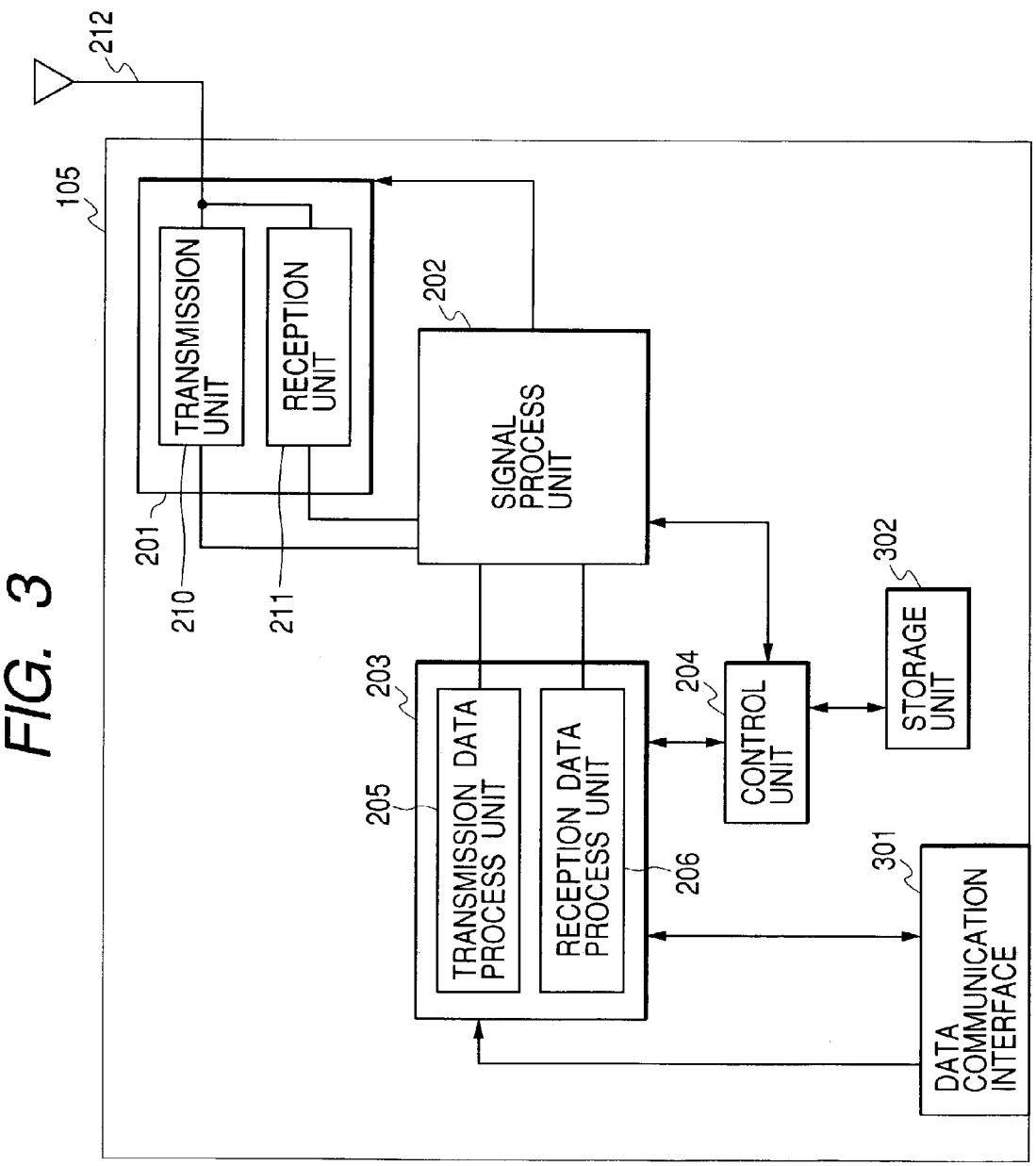
FIG. 3 is a block diagram of a client terminal according to the embodiment of the invention.

FIG. 3 is a block diagram of the client terminal 105.

The client terminal 105 of the embodiment is constituted of a wireless communication card.

Functions similar to those of the access point A103 shown in FIG. 2 are denoted by similar numerals.

A reference numeral 301 denotes a data communication interface, which is connected to an information processor such as a personal computer to perform data communication.

A reference numeral 302 denotes a storage unit, which stores an encipher key for WEP enciphering, and information regarding an ID or the like of the client terminal 105 necessary for wireless communication with the access point A103 or the access point B104. According to the embodiment, as an ID of the client terminal 105, a media access control (MAC) address is used.

Next, description will be made an operation of the entire system of the embodiment with reference to the drawings.

Figure 4:
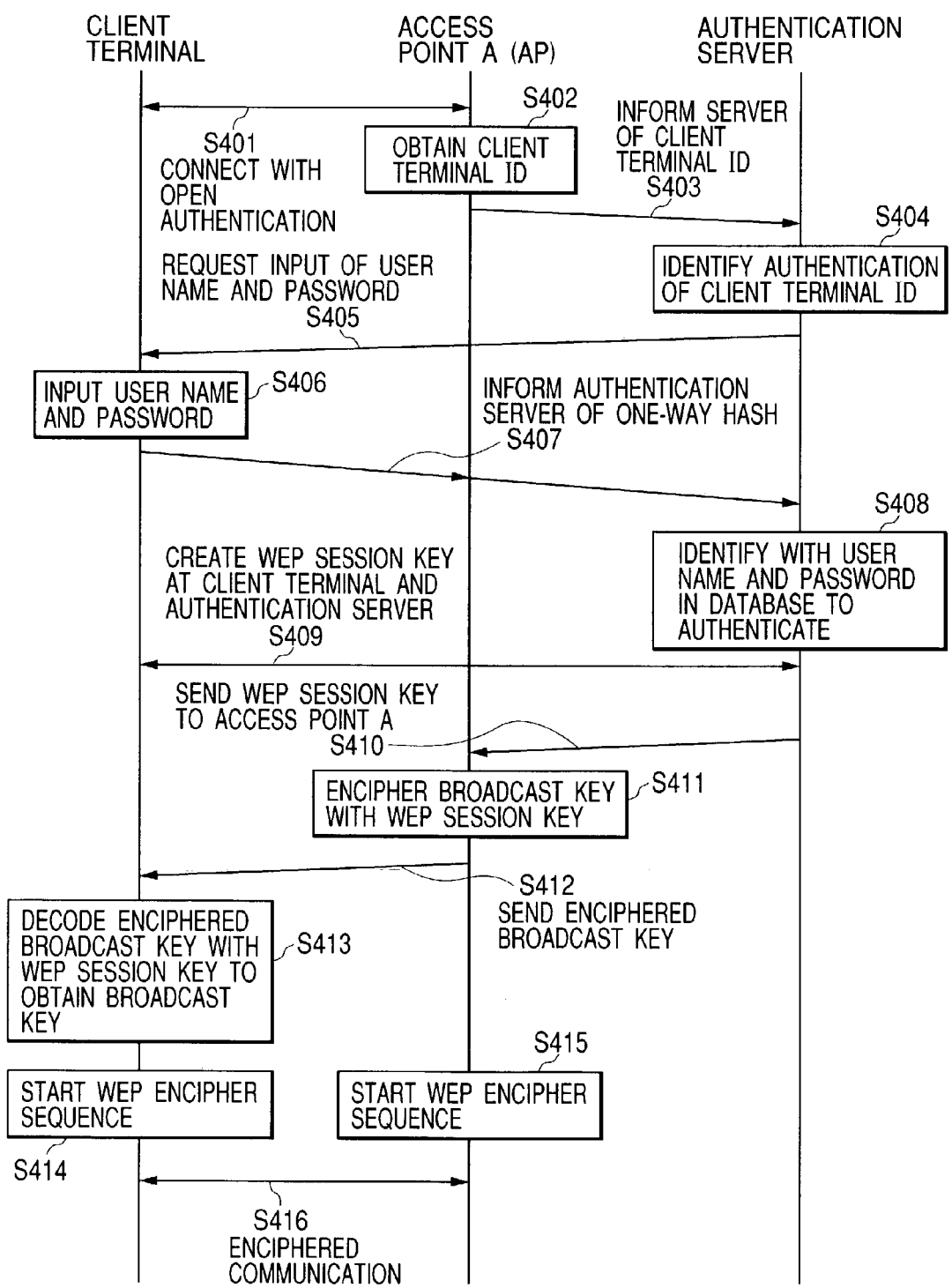
FIG. 4 is a sequential view showing a system operation according to the embodiment of the invention.

First, a process of first connection of the client terminal 105 to the network 101 through the access point A103 is explained by referring to a sequential view of FIG. 4.

The client terminal 105 executes open authentication in the wireless LAN to be connected to the access point A103 (S401).

The access point A103 obtains an ID of the client terminal 105 (S402).

The access point A103 informs the authentication server 102 of the ID of the client terminal 105 (S403).

The authentication server 102 determines whether authentication for the connection of the client terminal 105 to the network 101 has been finished or not, based on the ID informed from the access point A103 (S404). The client terminal 105 makes the connection for the first time, and the authentication has not been finished. Thus, it is determined that the authentication has not been finished.

The authentication server 102 requests the client terminal 105 to input a user name and a password (S405).

The client terminal 105 inputs the user name and the password (S406).

In order to enhance secrecy of the user name and the password inputted in step S406, the client terminal 105 executes irreversible numerical value processing called one-way hash, and informs the authentication server 102 of its one-way hash data (S407).

The authentication server 102 collates the one-way hash data informed in step S407 with a data group regarding a user for permitting connection to the network 101, which is saved in a database in the authentication server 102. If a result of the collation shows coincident data, the connection to the network 101 is permitted to the client terminal 105, and the ID of the client terminal 105 is stored (step S408).

The client terminal 105 and the authentication server 102 create an encipher key called a WEP session key (S409). The WEP session key is an encipher key, which is used in the WEP encipher system, and valid only for enciphering traffic of the client terminal 105.

The authentication server 102 stores the created WEP session key in association with the ID of the client terminal 105, and informs it to the access point A103 (S410).

The access point A103 enciphers a broadcast key with the WEP session key (S411), and sends the enciphered broadcast key to the client terminal 105 (S412). The broadcast key is an encipher key, which is used when data broadcast from the access point A130 to a plurality of client terminals 105 is enciphered.

The client terminal 105 decodes the enciphered broadcast key by using the WEP session key created in step S409 to obtain a broadcast key (S413).

The access point A103 and the client terminal 105 start WEP encipher sequences (S414, S415).

Then, in communication with one client terminal 105 (point-to-point communication, the access point A103 transfers data enciphered with the WEP session key to perform secure wireless communication (S416). In broadcast communication with a plurality of client terminals 105 (point-to-multipoint communication), the access point A103 transfers data enciphered with the broadcast key to perform secure wireless communication (S416).

FIG. 5 shows a sequential view of an operation when the client terminal 105, for which authentication of its connection to the network 101 through the access point A103 has been finished, is moved from the communicable range 106 of the access point A103 to the communicable range 107 of the access point B104 to be connected to the network 101 through the access point B104.

The client terminal 105 is moved out of the communicable range 106 of the access point A103 to be incommunicable with the access point A103 (S501). Then, the client terminal 105 is moved into the communicable range 107 of the access point B104 to be communicable with the access point B104.

The client terminal 105 executes open authentication to be connected to the access point B104 (S502).

The access point B104 obtains an ID of the client terminal 105 (S503).

The access point B104 informs the authentication server 102 of the ID of the client terminal 105 (S504).

The authentication server 102 determines whether authentication for the connection of the client terminal 105 to the network 101 has been finished or not, based on the ID informed in step S504, and the stored ID of the client terminal 105, for which the authentication has been finished (S505). Here, for the client terminal 105, the authentication of its connection to the network 101 through the access point A103 was finished in step S408 (FIG. 4), and the ID of the client terminal has been stored. Thus, it is determined that the authentication has been finished.

The authentication server 102 instructs the access point A103 to delete the WEP session key stored in the storage unit 207 to be used for wireless communication with the client terminal 105 (S506).

The authentication sever 102 informs the access point B104 of the WEP session key stored in association with the ID of the client terminal 105 in step S410 (FIG. 4) (S507).

The access point B104 enciphers a broadcast key with the WEP session key informed in step S507 (S508), and sends the enciphered broadcast key to the client terminal 105 (S509).

The client terminal 105 decodes the enciphered broadcast key by the WEP session key created in step S409 (FIG. 4) to obtain a broadcast key (S510).

The access point B104 and the client terminal 105 start WEP encipher sequences (S511, S512).

Then, in communication with one client terminal 105 (point-to-point communication), the access point B104 transfers data enciphered with the same WEP session key as that used for the communication between the client terminal 105 and the access point A103 to perform secure wireless communication (S513). In broadcast communication with a plurality of client terminals 105 (point-to-multipoint communication), the access point B104 transfers data enciphered with the broadcast key to perform secure wireless communication (S513).

In the embodiment, in step S507, the WEP session key stored in the authentication server 102 is informed to the access point B104. However, the WEP session key stored in the access point A103 may be informed through the authentication server 102 to the access point B104.

In the foregoing explanation, the client terminal 105 was the wireless communication card. However, a function similar to the wireless communication card may be incorporated in a personal computer or personal digital assistants (PDA).

Needless to say, the object of the present invention can be achieved by supplying a storage medium, in which software program codes for realizing the functions of the client terminal, the access points, and the authentication server are stored, to a system or a device, and causing the system or a computer (alternatively CPU or MPU) of the device to read and execute the program codes stored in the storage medium.

In such a case, the program codes read from the storage medium realize the functions of the embodiment themselves, and the storage medium, in which the program codes are stored, constitutes the present invention.

As the storage medium for supplying the program codes, a ROM, a floppy disk, a hard disk, an optical disk, a magneto-optical disk, a CD-ROM, a CD-R, a magnetic tape, a non-volatile memory card or the like can be used.

Needless to say, not only the case of realizing the functions of the embodiment by executing the program codes read by the computer, but also a case where based on instructions of the program codes, a part or all of the actual process is executed by an OS or the like working on the computer to realize the functions of the embodiment are included in the present invention.

Furthermore, needless to say, a case where the program codes read from the storage medium are written in a CPU or the like provided in a function extension board inserted into the computer or a function extension unit connected to the computer and, then, based on instructions of the program codes, the CPU or the like provided in the function extension board or the function extension unit executes a part or all of the actual process to realize the functions of the embodiment is included in the present invention.

As described above, according to the present invention, it is possible to enhance usability of the device.

It is possible to shorten time until communication becomes possible when the client terminal changes an access point.

Moreover, it is possible to reduce a process when the client terminal changes an access point.

What is claimed is:

1. A communication system having a plurality of wireless access points for connecting a client terminal, and a server apparatus, said server apparatus comprising:
   authentication device for authenticating a client terminal which is connected to a first wireless access point;
   informing device for informing said first wireless access point, to which the client terminal is connected, of an encipher key that is used for wireless point-to-point communication between the client terminal and the first wireless access point in accordance with the result of the authentication by said authentication device;
   determination device for determining whether or not a client terminal has been authenticated on the basis of identification information of the client terminal informed from a second wireless access point; and
   control device for requesting said informing device to inform the second wireless access point of a same encipher key as an encipher key informed to the first wireless access point and instructing the first wireless access point to delete the encipher key, in accordance with the determination result by said determination device,
   said first wireless access point comprising a first transmission device which enciphers a broadcast key for a wireless point-to-multipoint encipher communication between said first wireless access point and the client terminals with the encipher key informed by said informing device, and transmits the enciphered broadcast key to the client terminal, and
   said second wireless access point comprising a second transmission device which enciphers a broadcast key for a wireless point-to-multipoint encipher communication between said second wireless access point and the client terminals with the encipher key informed by said informing device, and transmits the enciphered broadcast key to the client terminal.

2. The system according to claim 1, further comprising:
   creation device for creating the encipher key used for wireless communication between the client terminal and the first wireless access point in accordance with the authentication by said authentication device,
   wherein the encipher key informed to the second wireless access point by said informing device is an encipher key stored when the creation device creates, or an encipher key received from the first wireless access point.

3. The system according to claim 1, wherein said informing device informs a same encipher key as an encipher key informed to the first wireless access point when the determination device determines that the client device has been authenticated, and informs a new encipher key when the determination device determines that the client device has not been authenticated.

4. A control method for a server device comprising the steps of:
   authenticating a client terminal which is connected to a first wireless access point;
   informing the first wireless access point, to which the client terminal is connected, of an encipher key that is used for point-to-point wireless communication between the client terminal and the first wireless access point, in accordance with the result of the authentication in said authentication step;
   determining whether or not a client terminal has been authenticated on the basis of identification information of the client terminal informed from a second wireless access point; and
   informing the second wireless access point of a same encipher key as an encipher key informed to the first wireless access point and instructing the first wireless access point to delete the encipher key, in accordance with the determining result at said determining step,
   said first wireless access point comprising a first transmission device which enciphers a broadcast key for a wireless point-to-multipoint encipher communication between said first wireless access point and the client terminals with the encipher key informed by said informing device, and transmits the enciphered broadcast key to the client terminal, and
   said second wireless access point comprising a second transmission device which enciphers a broadcast key for a wireless point-to-multipoint encipher communication between said second wireless access point and the client terminals with the encipher key informed by said informing device, and transmits the enciphered broadcast key to the client terminal.

* * * * *